April 29, 1952  R. C. VALENZUELA  2,594,307
SECTIONAL PLANT POT
Filed Jan. 24, 1947
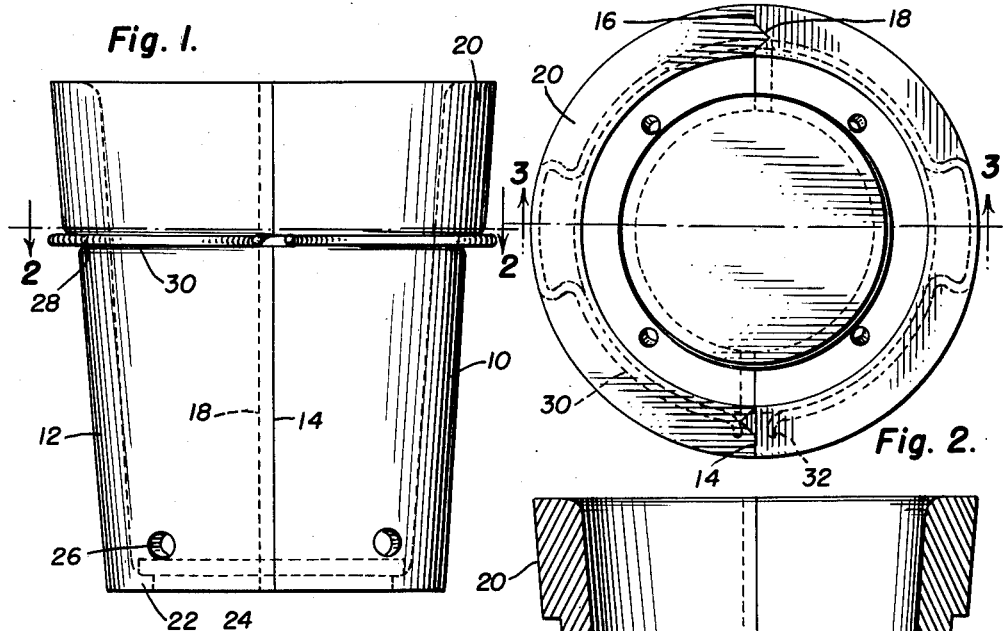
Fig. 1.
Fig. 2.
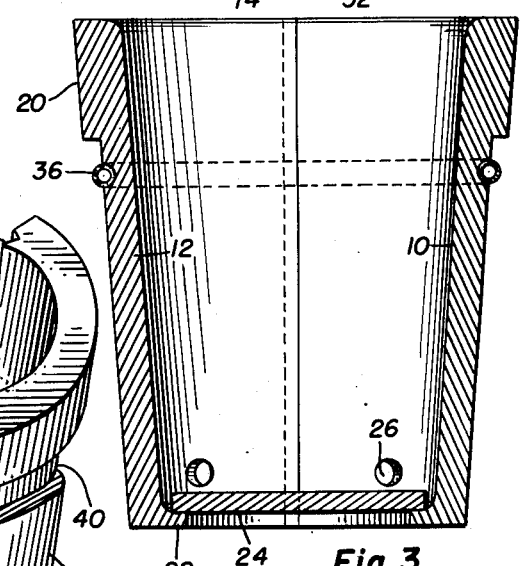
Fig. 3.
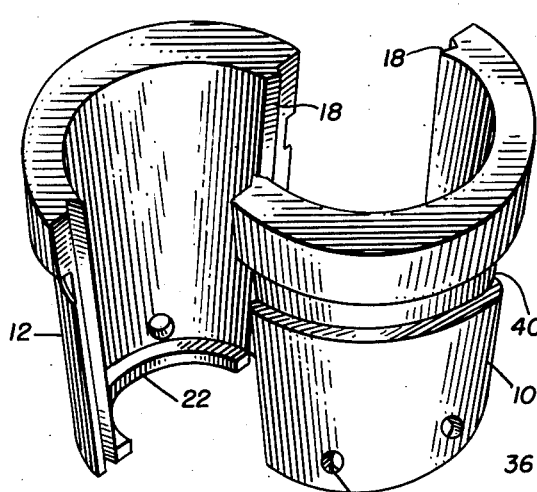
Fig. 4.
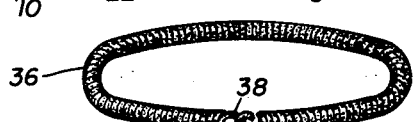
Fig. 6.
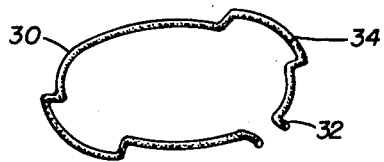
Fig. 5.
Inventor
Ralph C. Valenzuela
By *Clarence A. O'Brien and Harvey B. Jacobson*
Attorneys Patented Apr. 29, 1952

2,594,307

UNITED STATES PATENT OFFICE 2,594,307

SECTIONAL PLANT POT

Ralph C. Valenzuela, Los Angeles, Calif.

Application January 24, 1947, Serial No. 724,014

2 Claims. (Cl. 47—37)

This invention relates to sectional plant pots generally, and more particularly, to plant pots of discerptible character, the segments thereof being held together by spring means, the device being of particular value to nurserymen.

A primary object of this invention is, therefore, to provide a pot which is easily removable from the soil associated with the root growths of potted plants.

Another object of this invention is to provide convenient and efficient substitute means for the unsightly and unhandy cans commonly used to retain potted plants in nurseries.

Another object of this invention is to provide a discerptible pot of a general character and configuration allowing the storage of large numbers of these pots in a small space.

Another object of this invention is to provide a pot in which the two halves are identical, thus greatly simplifying the manufacture and the use, this object also being achieved when large pots manufactured according to this invention are made in three or more parts.

And a last object to be specifically mentioned is to provide a device of this character which is inexpensive and practicable to manufacture, extremely simple and convenient to use, and which will give generally efficient and durable service.

With these and other objects in view as will appear hereinafter as this description proceeds, this invention resides in certain novel features of construction, combination and arrangement of parts and portions as will be hereinafter described in detail and particularly set forth in the appended claims, reference being had to the accompanying drawings which form a material part of this application, and in which:

Figure 1 is a side elevational view of the assembled plant pot;

Figure 2 is a top plan view of the same showing the clasping spring in dash lines;

Figure 3 is a vertical sectional view, taken on the line 3—3 in Figure 2, and illustrating a modified form of clasping spring;

Figure 4 is a perspective view of two similar sections having wide grooves for the retention of the modified form of clasping spring, the view being designed to illustrate how the two sections of the pot are assembled with the tongued and grooved abutment faces interlocking;

Figure 5 is a perspective view of the first mentioned clasping spring; and

Figure 6 is a perspective view of the coiled annulus comprising the above referred modified form of clasping spring.

Similar characters of reference designate similar or identical parts and portions throughout the specification and throughout the several views of the drawing.

Referring now to the drawing which represents preferred embodiments of the elements of this invention, it will be noted that this invention envisages the provision of two similar segments 10 and 12 to jointly comprise the side wall portions of the pot, and the drawings herein are limited to representation of this formation from two parts although the instant invention can obviously be reduced to practice using three, four or more similar side wall panels.

The illustrated segments are semi-circular in cross-section and are tapered so that the diameter of the top of the assembled pot will be larger than the diameter of the base thereof, and the abutment faces, shown at 14 and 16 in Figure 2, are equipped with interlocking portions, which may be of simple tongue and groove character, to make the assembled side walls water-tight, as illustrated at 18. An upper rim 20 of enlarged diameter will normally be provided in order to conform with the common configuration of such pots.

At the base of each segment 10 and 12, an interior flange 22, disposed horizontally and of a width not greatly in excess of that necessary to adequately support a disc 24 which comprises the bottom or base of the pot. A plurality of apertures 26 are provided in the sides of the segments 10 and 12 immediately above the level of the disc 24 to provide for the drainage of excess water.

Immediately below the rim 20 a semi-annular recess 28 is made in each segment 10 and 12, these recesses registering to form an annular groove in the assembled pot for the reception of a clasping spring 30 which is best represented in Figure 5, which spring is essentially a split ring of resilient material having outwardly turned end portions 32 and intermediate offset portions 34 by which the spring may be readily grasped.

It will, of course, be noticed that the two segments are identical in all respects, including the positioning of the tongues and grooves 18, thus greatly facilitating the manufacture of this device. It should also be noticed that in the following description of the modification of this invention depicted in Figures 3, 4 and 6, the reference characters applied to these figures are the same as the reference characters applied to exactly similar parts in the modification described above. For example, the side walls 10 and 12, disc 24, flanges 22 and the top collar or rim 20 may all be identical with the parts hereinbefore described.

A preferred embodiment of the clasping spring is illustrated in Figure 6 and comprises a coiled annulus 36 having interlocking end links 38, the normal diameter thereof being slightly less than the root diameter of the groove 40, best illustrated in Figure 4. This groove 40 corresponds substantially with the annular recess 28 shown in Figure 1 but will normally be of greater width since the coiled spring 36 will normally be of greater diameter than the clasping spring 30.

With the foregoing description of the mechanical details of this invention in view, the method of operation will be obvious but in recapitulation it may be well to note that the segments 10 and 12 are placed together with the tongued and grooved portions 18 properly aligned and the clasping spring 30 or 36 slipped into the recess 28 or 40 to hold the said segments together. The disc 24 may then be dropped into the base of the assembled pot to be removably supported on the flanges 22. Potted plants and soil may then be inserted in the assembled pot in the normal manner. When it is desired to remove a plant from this improved pot the spring 30 or 36 is slipped off and the segments 10 and 12 will readily part away from the soil and root growth of the plant.

It will now be evident that all the objects recited above are fully and amply achieved by this invention and a further advantage of this discerptible pot will now be clear, namely, the unbroken or compact character of this root growth and soil when removed from this improved pot, a feature which greatly lessens the labor incident to the sale and transplanting of potted plants.

It is thought that the foregoing description of the mechanical details and the method of operation of this device will enable anyone to make and use this invention and to completely understand the same, and further description is, therefore, deemed unnecessary.

Though there has been shown a particular embodiment of this invention and one modification thereof, this application is not limited to this particular embodiment and modification, but it is desired to include in the scope of this invention the construction, combination and arrangement of parts and portions substantially as set forth in the appended claims.

Having thus described this invention what is claimed as new and desired to be secured by Letters Patent is:

1. A discerptible plant pot including a pair of tapered complementary side wall sections having registrable exteriorly disposed grooves intermediate the ends thereof and having registrable interiorly disposed flanges at the reduced ends thereof, said sections having abutment faces with interlocking portions of V-shaped tongue and groove character adjacent the inner edges of said abutment faces to make a wall of an assembled pot substantially watertight and to assure proper registration of the sections, a disc plate, and a split ring spring to clasp said sections together insertable in said exterior grooves with said plate supported on said interior flanges, said spring having outwardly offset portions comprising handles for the pot and facilitating the assembly and disassembly of the pot.

2. Means for holding side wall sections of a discerptible flower pot together, comprising a split ring spring, said spring having radially outwardly offset diametrically oppositely disposed portions comprising U-shaped handles for the pot and facilitating the assembly and disassembly of the spring on the pot.

RALPH C. VALENZUELA.

REFERENCES CITED

The following references are of record in the file of this patent:

UNITED STATES PATENTS

| Number | Name | Date |
| --- | --- | --- |
| 310,592 | Johnson | Jan. 13, 1885 |
| 445,048 | Cripps | Jan. 20, 1891 |
| 473,836 | Goodacre | Apr. 26, 1892 |
| 579,295 | Delzell | Mar. 23, 1897 |
| 980,873 | Kleeman | Jan. 3, 1911 |
| 1,776,375 | Russell | Sept. 23, 1930 |
| 1,868,609 | Lam | July 25, 1932 |

FOREIGN PATENTS

| Number | Country | Date |
| --- | --- | --- |
| 10,089 | Australia | Oct. 27, 1927 |